No. 693,916. Patented Feb. 25, 1902.
E. D. & H. N. SPEER.
CONDUIT FOR ELECTRIC WIRES.
(Application filed Oct. 25, 1901.)
(No Model.)

Witnesses
Frank Fritsch
Charles W. Hildreth

Edward D. Speer } Inventors
Horace N. Speer
By their Attorney
Walter Brown

UNITED STATES PATENT OFFICE.

EDWARD D. SPEER AND HORACE N. SPEER, OF NEW YORK, N. Y.

CONDUIT FOR ELECTRIC WIRES.

SPECIFICATION forming part of Letters Patent No. 693,916, dated February 25, 1902.

Application filed October 25, 1901. Serial No. 79,993. (No model.)

*To all whom it may concern:*

Be it known that we, EDWARD D. SPEER and HORACE N. SPEER, citizens of the United States of America, and residents of the borough of Manhattan, in the city of New York and State of New York, have invented certain new and useful Improvements in Conduits for Electric Wires, of which the following is a specification.

Our invention relates to improvements in fireproof insulating-ducts, and especially such as are intended for electric wires. In order to be practicable, safe, and durable, the duct must be so constructed that it shall be waterproof to prevent deterioration from moisture, that it shall be fireproof to prevent ignition by a possible electric spark, and that it shall be flexible, so that it can be readily carried around the corners and bends which are frequently found in buildings without breaking or buckling. We obtain these results, together with a simple and cheap construction, by the invention hereinafter described, and illustrated in several modifications in the accompanying drawings, whereof—

Figure 1:
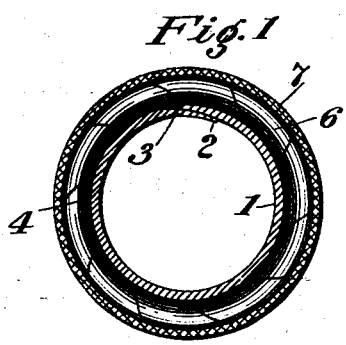
Figure 3:
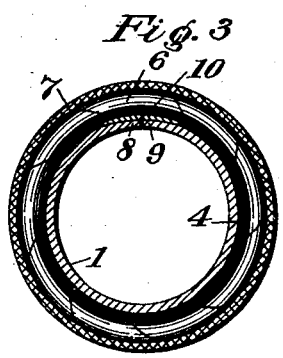
Figure 2:
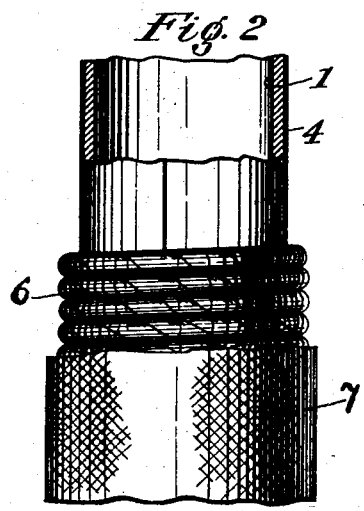
Figure 4:
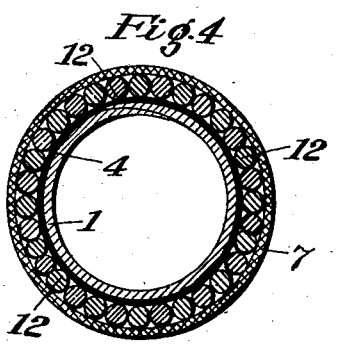
Figure 6:
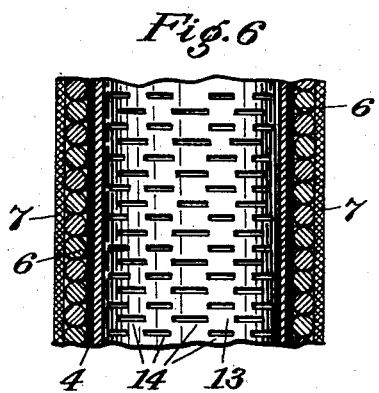
Figure 5:
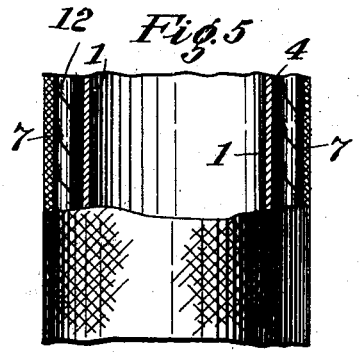

Figure 1 is a cross-section of a duct with a spiral winding of cord around the inner tube. Fig. 2 is a longitudinal broken section and elevation of the same. Fig. 3 is a cross-section of a duct differing from that shown in Figs. 1 and 2 in that the edges of the inner tube make a butt-joint which is covered by a longitudinal strip. Fig. 4 is a cross-section of a duct wherein the inner tube is surrounded by longitudinal cords, and Fig. 5 is a broken longitudinal section of the same. Fig. 6 is a longitudinal diametrical section of a duct wherein the inner tube is perforated to increase the flexibility of the duct.

Referring to Figs. 1 and 2, the inner tube 1 is formed in any suitable manner—as, for example, on a mandrel—and of any suitable material, as paper or muslin or other like material, the meeting edges 2 3 making a lapped joint and being cemented together. Before forming the tube 1 the material is thoroughly saturated with a fireproofing solution, which is preferably composed of two ounces avoirdupois of phosphate of ammonia in a quart of water. After saturation the material is dried and then formed into the tube. The said tube 1 is then covered with a coat of a suitable waterproofing composition, which is preferably composed of eighty parts of refined asphalt and one hundred parts of candle-pitch, by weight. The candle-pitch is melted and the asphalt dissolved in it. The proportions of candle-pitch and asphalt may be varied according as it is desired to make the composition more sticky or harder. While the waterproof coat is still soft and sticky a cord 6 of any suitable material, as cotton, hemp, or other cord, is wound tightly spirally from end to end of the tube 1, the said cord 6 having been first thoroughly saturated with fireproofing solution and dried. The waterproof coat 4 being still sticky and soft the cord 6 embeds into it and is held firmly upon the tube 1 when the said coat 4 dries. The windings of the cord utilize the principle of the arch to keep the duct open and firm against collapsing when carried around bends. Next, a cover 7 of a suitable material is braided over the cord 6 by a suitable braiding-machine, the yarn for said covering 7 having been first saturated with fireproofing solution and then dried. Finally, a coat of a suitable waterproofing paint—as, for instance, the same as was applied to the tube 1—is put on the cover 7. This duct has great flexibility, strength, and durability, is thoroughly fire and water proof, and we believe can be manufactured more cheaply than any other, while superior in quality to any yet known.

A slight modification of the duct is shown in Fig. 3. The inner tube 1, waterproof coat 4, spiral cord-winding 6, and braided cover 7 are similar to those shown in Figs. 1 and 2, except that the edges 8 9 of tube 1 now make a butt-joint, and the joint is covered with a strip 10 of any suitable material laid lengthwise of the tube 1 and cemented to said tube.

Referring to Figs. 4 and 5, the inner tube 1 and the waterproof coat 4 are similar to those shown in Figs. 1 and 2; but while the said waterproof coat 4 is still soft and sticky the cord 12 is applied longitudinally of the tube 1, as shown. The layers of the cord 12 are parallel and preferably side by side, so as to completely surround and inclose the inner tube 1 and are held in their proper position by the hardening of the waterproof coat 4. The cords 12 lying closely side by side utilize the principle of the arch in the construction of the tube. A braided cover 7 is applied outside of the cord 12, as hereinbefore described, and outside of all is a coat of waterproof paint, also as hereinbefore described.

Referring to Fig. 6, the cover 7, cord 6, and waterproof coat 4 are similar to those shown in Figs. 1 and 2; but the inner tube 13 is now formed of a fabric which is perforated with holes 14, preferably staggered, as shown, to increase the flexibility of the duct. This perforation is especially useful in cases when the inner tube is made of a comparatively stiff material, as paper, and while the drawings show such a perforated inner tube in a duct having a spiral cord-winding 6 the perforations will be even more advantageous in the inner tube of a duct having the longitudinal cords, as in Figs. 4 and 5. Indentations or corrugations of the tube 13 may also be used as the equivalent of perforations.

In all the modifications of the invention hereinbefore described there is an inner tube arranged longitudinally of the duct, and outside of this is cord arranged spirally around or longitudinally of the tube. By "cord" we intend either "cord" properly so called, twine, yarn, marline, wire, or generally any filamentary body which is capable of being wound around or laid along the inner tube and around the same, and we intend that the term "cord" in the specification and claims shall include all such filamentary bodies, whether of combustible or incombustible material, as wire or asbestos twine. When the cord is of incombustible material, it does not require to be treated with fireproofing solution; but when it is of combustible material, as cotton or hemp, it should be treated with such solution in order that the structure of the duct from inside to outside may be generally fireproof.

Now, having described our improvements, we claim as our invention—

1. A duct for electric wires having a fireproof inner tube of flexible material, a layer of fireproof cord thereon and a cover of fireproof material outside of all, substantially as described.

2. A duct for electric wires having an inner tube composed of a longitudinally-arranged sheet of flexible fireproof material, a waterproof coating on said tube, a layer of fireproof cord on said tube, a fireproof cover outside of the cord, and a waterproof coating on said cover, substantially as described.

3. A duct for electric wires having an inner tube composed of a fireproof flexible longitudinally-arranged sheet of material, a waterproof coating thereon, a spirally-wound fireproof cord outside of said tube, a fireproof cover outside of said cord, and a waterproof coating on said cover, substantially as described.

4. A duct for electric wires having an inner tube composed of a fireproof flexible longitudinally-arranged sheet of material, a waterproof coating on said tube, rows of fireproof cord on the outside of said tube, a cover on said cord, and a waterproof coating on said cover, substantially as described.

5. In a duct for electric wires, the combination with outer layers of a longitudinally-arranged perforated fireproof inner tube, substantially as described.

6. In a duct for electric wires, the combination of an inner flexible longitudinally-arranged fireproof sheet forming a tube, a layer of cord around outside said tube, and a cover on the cord, substantially as described.

Signed at New York city this 16th day of October, 1901.

EDWARD D. SPEER.
HORACE N. SPEER.

Witnesses:
DAVID WALTER BROWN,
HENRY V. BROWN.